United States Patent [19]
Harris et al.

[11] Patent Number: 5,560,103
[45] Date of Patent: * Oct. 1, 1996

[54] BEARING WITH BEARING SURFACE OF INTEGRALLY BONDED SELF-LUBRICATING MATERIAL

[75] Inventors: Bernard Harris, Northbrook; Dennis E. Bozych, Downers Grove, both of Ill.

[73] Assignee: Rexnord Corporation, Milwaukee, Wis.

[*] Notice: The portion of the term of this patent subsequent to Aug. 26, 2012, has been disclaimed.

[21] Appl. No.: 445,803

[22] Filed: May 19, 1995

Related U.S. Application Data

[62] Division of Ser. No. 935,881, Aug. 26, 1992, Pat. No. 5,431,500.

[51] Int. Cl.$^6$ .................................................. B23P 15/00
[52] U.S. Cl. ........................ 29/898.05; 29/898.055; 29/898.059; 156/154
[58] Field of Search ................... 29/898.05, 898.055, 29/898.054, 898.059, 898.12, 898.15, 898.04, 898; 384/298; 156/154, 170, 172, 173

[56] References Cited

U.S. PATENT DOCUMENTS

| | | | |
|---|---|---|---|
| 1,936,863 | 11/1933 | Skillman | 29/149.5 |
| 1,937,988 | 12/1933 | Sheldrick | 308/72 |
| 2,606,795 | 8/1952 | Hutton | 308/72 |
| 3,616,000 | 10/1971 | Butzow et al. | 156/173 |
| 3,687,509 | 8/1972 | Schweizer | 308/72 |
| 3,700,295 | 10/1972 | Butzow et al. | 308/72 |
| 3,713,932 | 1/1973 | Butzow et al. | 156/173 |
| 3,804,479 | 4/1974 | Butzow et al. | 308/238 |
| 3,888,554 | 6/1975 | McCloskey | 308/72 |
| 3,891,488 | 6/1975 | White | 156/170 |
| 3,974,009 | 8/1976 | Butzow et al. | 156/84 |
| 3,993,369 | 11/1976 | McCloskey | 308/72 |
| 4,129,343 | 12/1978 | Janssen | 308/35 |
| 4,132,452 | 1/1979 | Riegler et al. | 308/3 R |
| 4,867,889 | 9/1989 | Jacobson | 252/12.6 |
| 5,087,132 | 2/1992 | Tanaka et al. | 384/276 |
| 5,288,354 | 2/1994 | Harris et al. | 29/898.055 |

*Primary Examiner*—Irene Cuda
*Attorney, Agent, or Firm*—Michael, Best & Friedrich

[57] ABSTRACT

A method of making bearing including a substratum having a configured external surface to which a self-lubricating material is integrally bonded to provide a self-lubricating bearing surface, the method including; applying a layer of self-lubricating resin penetrable bearing material onto the configured external surface; providing a hardenable liquid resin to coat and penetrate the bearing material; applying an overlayment of filaments onto the layer of bearing material to exert a bonding pressure on the layer of bearing material sufficient to cause the layer of bearing material to conform and bond to the configured external surface; hardening the resin; and removing at least part of the overlayment of filaments after the resin has hardened to expose at least selected portions of the layer of self-lubricating bearing material.

14 Claims, 3 Drawing Sheets

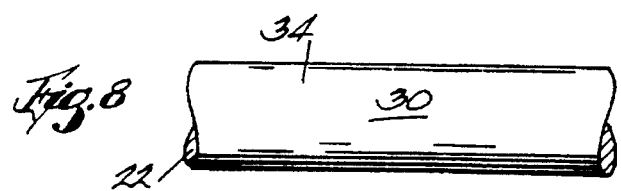
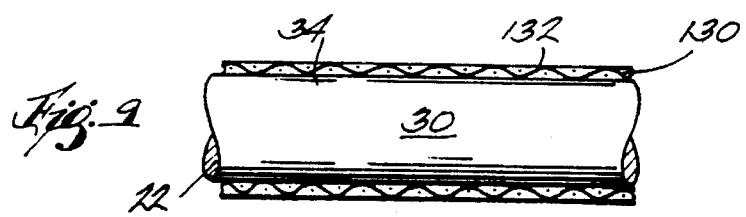
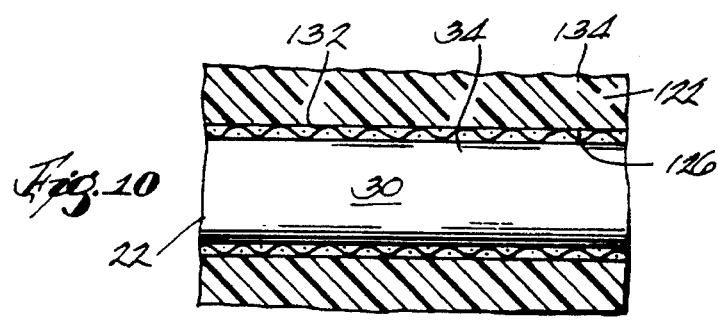
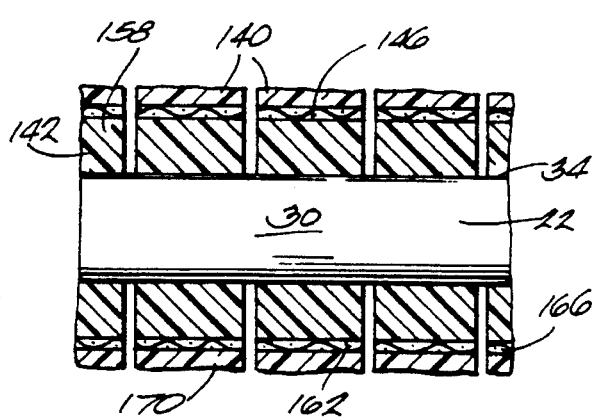
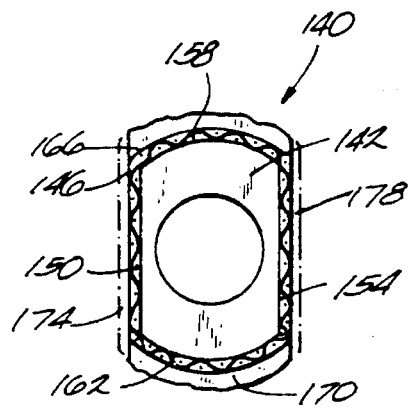

BEARING WITH BEARING SURFACE OF INTEGRALLY BONDED SELF-LUBRICATING MATERIAL

This is a division of application Ser. No. 07/935,881, filed Aug. 26, 1992, entitled "BEARING WITH BEARING SURFACE OF INTEGRALLY BONDED SELF-LUBRICATING MATERIAL", now U.S. Pat. No. 5,431,500.

BACKGROUND OF THE INVENTION

This invention relates to self-lubricating bearings, and, more particularly, to bearings provided by an improved method for affixing a self-lubricating material to a bearing external surface.

Many bearings are known which have a self-lubricating surface. For instance, it is known to use low friction fabric of woven Teflon (a DuPont trademark for tetrafluoroethylene) filaments adhered to structural bearing elements to provide a low friction surface. In U.S. Pats. Nos. 3,974,009, 3,891,488, 3,804,479, 3,713,932, 3,700,295 and 3,616,000, bearing elements are disclosed having such a low friction, or self-lubricating, fabric material bonded to the inner surface of bearing elements. These patents generally disclose a process whereby fabric is applied over a mandrel and the structural body of the bearing element is built up over the fabric. Resin-impregnated fiberglass filaments are repeatedly wound about the fabric in order to form the body of the bearing element. Upon curing and hardening of the resin the fiberglass body becomes bonded to the fabric, the fabric thereafter forming the inner bearing surface. These known methods only produce bearing elements with low friction inner surfaces. These inner surfaces may additionally have irregular configurations, such as the surfaces found on the inside of the lined nuts disclosed in U.S. Pat. No. 3,713,932.

Bonding a low friction material to an existing outer or external surface of a finished bearing element to produce a long life bearing surface has been an unsolved problem for decades in spite of extensive development in this art. The low friction material, particularly self-lubricating fiber, by its nature resists bonding to another surface. Existing methods do not produce an external bearing surface that will resist pealing, galling and abrading in high stress load applications and known bearings cannot be used in such applications without unacceptably high frequent replacement. U.S. Pat. No. 5,087,132 discloses a method for lining the outer surface of a straight cylindrical bearing element, such as a pipe, with a low-friction fabric. The surface is pre-treated, in an attempt to provide a surface which will bond to the cured resin, the fabric and resin are degassed and the fabric wound over the surface with the resin. The resin-impregnated fabric is subsequently cured to affix the fabric to the surface.

Another approach for applying a low friction surface to a cylindrical outer surface comprises applying resin to such a surface, wrapping it with a film of high-wearing material, such as the polyester mylar, and heat shrinking the film to conform it to the surface. This approach has not been successfully utilized to apply a low friction surface to a spherical or otherwise irregularly configured outer surface. Mylar will not shrink to conform to recessed circumferential areas.

The problem is even more difficult, however, when the existing surface is an irregular-shaped, noncylindrical external surface, such as a spherical surface. It is very difficult to bond low friction fabric material over an irregular external surface. Problems arise in conforming the fabric to the outer surface in a tight fitting configuration, with difficulty encountered in thoroughly impregnating the cloth with the bonding resin. Upon cure of the resin there is no certainty in obtaining a secure mechanical interlock between the self-lubricating fibers of the cloth and the surface of the structural bearing element. U.S. Pat. No. 5,087,132 does not disclose forming a tightly toleranced bonding of an irregular-shaped substratum external surface to fabric.

U.S. Pat. No. 3,891,488 is one attempt to overcome this difficulty. This patent discloses a method of producing a bearing element by repeatedly winding a resin coated bondable low friction filament over an external spherical surface to form a low friction surface. The filament is first impregnated with resin and the resin partially cured to a tacky state in an effort to both make the filament adhere to the surface and to form a uniform single layer over that surface. The pre-treated filament is then wound on cones for handling prior to winding onto the bearing element surface. A single layer of thread is formed by helically wrapping the thread over the entire external surface. Heat and pressure are then applied in order to conform the fibers to the external surface, to finish the cure of resin and bond the low friction filaments to one another and to the surface. Roughening or similar such treatment to the surface of the bearing element is necessary to provide a good bond with the resin.

The known methods are complicated and costly, requiring various steps such as pre-coating and pre-partial curing of resin on low friction filaments, winding of filament, pressing and heat curing of the surfaces in dies, all designed to secure self-lubricating filaments to an external surface, and yet still do not produce a bearing surface that will have a long life in high stress load applications.

SUMMARY OF THE INVENTION

Among the objects of the invention is to provide a bearing element with an irregular external surface bonded to a low friction bearing material.

A more specific object is to provide such a bearing element which has a high strength to weight ratio and which can be manufactured at relatively low cost.

Another object is to provide such a bearing element produced by a less complicated method for applying a low friction material to an external surface, and at reduced cost.

The achievement of these and other objects is provided by a bearing element produced by a method comprising the steps of forming an external surface of a desired configuration on a substratum, applying a layer of self-lubricating fibers onto the surface, applying a plurality of filaments over the layer of fibers to form an overlayment thereon, and applying a hardenable liquid resin to the self-lubricating fiber to coat the filaments that make up the fibers and fill any interstices. Preferably the resin is applied simultaneously with an application of wound fiberglass. The winding is performed with tension to create a bonding pressure which will cause the layer of self-lubricating fibers to conform and bond tightly the configured external surface of the bearing element. To further improve the conformation the fibers can be provided as a woven fabric which includes beth shrinkable fibers, with the cloth preshrunk over the bearing element prior to the application of the resin impregnated fiberglass.

The overlayment is cured to form an outer substratum, which is subsequently removed to expose the self-lubricating fabric on the external surface of the inner substratum.

The removal of the outer substratum can be accomplished by conventional means, including machining, grinding or milling. The grinding or milling should be controlled to expose the self-lubricating fabric without damaging or removing the self-lubricating fibers.

The invention is particularly applicable to producing bearing elements with low-friction outer surfaces which are irregular and noncylindrical, although superior bearings having cylindrical outer surfaces are also provided. Superior bearings having a spherical outside diameter, such as the ball element of a ball and socket bearing are also provided. In one embodiment such a bearing element is produced where both internal and external surfaces are configured, with self-lubricating fibers integrally bonded to both surfaces. The bearing surface applied to the internal surface of the bearing element is applied in the known manner by filament winding an overlayment of resin-impregnated fiberglass onto a forming mandrel previously covered by a low friction material and curing the resin. The outer configured surface of the forming mandrel thereby defines the desired internal surface of the bearing element substratum.

Other features or advantages of the invention will become apparent to those of ordinary skill in the art upon review of the following detailed description, claims and drawings.

BRIEF DESCRIPTION OF THE DRAWINGS

FIG. 8 is a cross section of a winding mandrel prior to formation of a substratum.

FIG. 9 is a cross section of a winding mandrel as depicted in FIG. 8 showing an alternative embodiment whereby a low friction material is applied over the mandrel prior to formation of the substratum.

FIG. 10 is a cross section of the winding mandrel with the fabric of FIG. 9 showing a substratum formed over the low friction material.

FIG. 14 depicts an alternative bearing element which has both cylindrical and flattened external surfaces, showing a winding mandrel in cross section at a stage similar to that depicted in FIG. 7.

FIG. 15 is an end view of the element depicted in FIG. 14, wherein fabric is affixed over cylindrical and flattened external surfaces of an internal substratum, and wherein only the portion of the external substratum over the flattened surface has been removed.

DESCRIPTION OF THE PREFERRED EMBODIMENT

Figure 1:
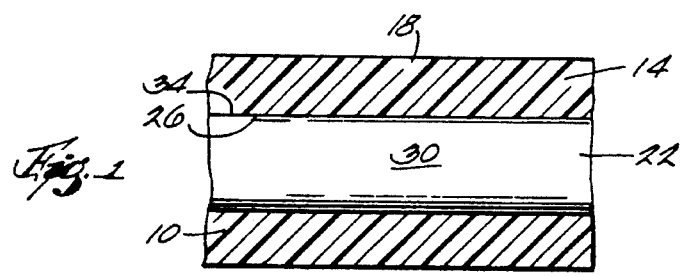
FIG. 1 is a cross section of a winding mandrel with an applied substratum.

A bearing with low friction material tightly bonded to its outer, or external surface can be produced by a method which comprises an initial step (FIG. 1) of providing a substratum 10. The substratum in FIG. 1 comprises a body 14 of material having an external surface 18. The substratum body 14 may be solid, or, as depicted in FIG. 1, may comprise a tube of material surrounding an inner rod, or mandrel 22, of any suitable material, in which case the substratum 10 also comprises an internal surface 26. The mandrel 22 generally comprises an elongated body 30 having ends (not depicted) and a surface 34. If the substratum body 14 is solid, the substratum 10 itself would constitute both substratum and mandrel for subsequent winding steps, as will be described.

In a preferred bearing the substratum 10 is produced of hardened filament-wound fiberglass material, which can be formed directly on the mandrel 22. It is not necessary that such a substratum 10 be used, however, as the method for producing the bearings can be utilized to apply a low-friction material over a variety of substratum materials, both natural and synthetic, including plastic and metal materials. Additionally, the substratum 10 can be formed from a series of connected elements.

The next step comprises forming a desired configuration on the external surface 18 of the inner substratum 10 by any appropriate method, such as by molding or machining. If a molding method is utilized, the inner substratum 10 will be created simultaneously with its desired configuration of the external surface 18.

Figure 2:
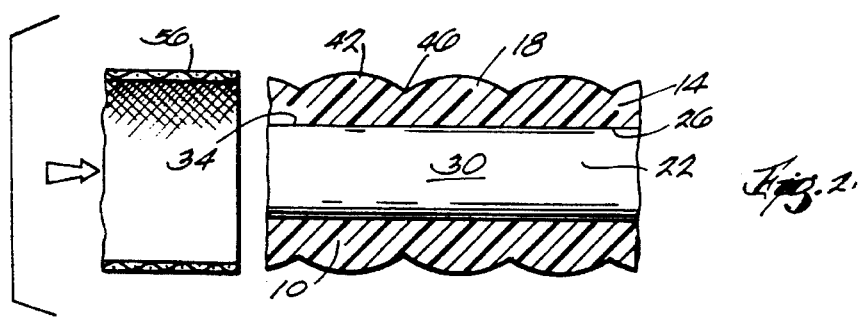
FIG. 2 is a cross section of a winding mandrel showing a preconfigured external surface produced in the substratum.

Numerous flattened, polygonal, cylindrical or spherical shapes can be configured into the external surface 18, and the surface 18 may comprise only portions of one or more of the above. For producing spherical ball elements of bearings, the external surface 18 of the inner substratum 10 will have a spherical external configuration. The configured external surface 18 depicted in FIG. 2 is produced of a series of adjacent spherical shapes formed in the substratum 10. Elevated portions 42 and recessed portions 46 of reduced diameter, relative to the mandrel 22, alternate to create the configuration of the external surface 18.

Alternatively, a prefabricated element or series of individual elements (not shown) may be assembled on a mandrel to form the substratum 10, with the external configurations of individual elements together forming the external surface 18 of the collective substratum 10. For instance a plurality of individual elements such as spherical bearings (not shown) may be assembled end to end on a winding mandrel 22. A collection of such bearing elements assembled on a winding mandrel 22 is described in U.S. Pat. No. 3,974,009, which is incorporated herein be reference. In such a case, the final external configuration of such an assembly would resemble the external configuration of the surface 18 in FIG. 2.

Figure 3:
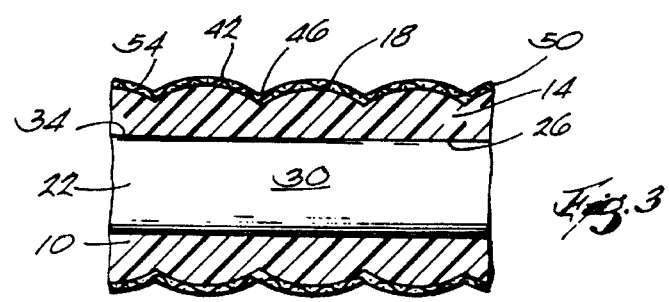
FIG. 3 is a cross section of a winding mandrel as depicted in FIG. 2 showing a low friction material applied over the external surface of the substratum.

Once the desired configuration for the external surface 18 has been set, by whatever mechanism, a layer of low friction material is applied over the external surface 18 (FIG. 3). In a preferred embodiment the low friction material is a fabric 50 comprising fibers 54 of self-lubricating material. The self-lubricating fabric 50 can optionally include interwoven fibers 54 of both self-lubricating and shrinkable materials. A preferred fabric 50 is described in U.S. Pat. No. 3,804,479, which is incorporated herein by reference, and comprises lengthwise yarns predominantly of self-lubricating fibers 54, such as Teflon fibers, and circumferential yarns of a material, for example Dacron yarn, which shrinks when heated to 300° F.

An alternative to heat shrinking involves applying the fabric 50 loosely over the substratum external surface 18 and stretching the fabric 50 axially, which concomitantly diminishes the circumference of the fabric sleeve 56, and thereby tightens the fabric 50 over the surface 18. In some cases this stretching alone will conform the fabric 50 to the surface 18 to sufficient degree.

For ease of application the fabric 50 can further be woven into a sleeve 56, shown in FIG. 2, which can be slid over the external surface 18 of the substratum 10. The sleeve 56 may be produced of any continuous length, and can be stored on a reel, not shown, until required. Such a sleeve 56 is disclosed in U.S. Pat. No. 3,616,000, which is incorporated herein by reference. The length of sleeve 56 applied over the inner substratum 10 should be on the order of 10% greater than the length of inner substratum 10 to permit gathering and allow for axial shrinkage pulling fabric 50 into depressions of the external surface 18. In the case of an external surface 18 having spherical portions, the gathering allows fabric 50 to be gathered into the reduced portions 46 (FIG. 3). If a composite fabric 50 having shrinkable material is used, the next step comprises heating the fabric 50 in order to shrink the shrinkable material and tightly conform the fabric 50 to the external surface 18 of the inner substratum 10.

When the fabric 50 is in tight conformation with the substratum external surface 18, only portions of the fibers actually contact the surface. The teflon fibers are alternatively in contact with the external surface 18 and bridged over crossing fibers and suspended over the external surface 18, thus forming many small voids (not shown) between the fibers 54 and the external surface 18.

A hardenable liquid resin 58 is applied to the low friction material and to the external surface 18 of the inner substratum 10. The resin 58 can be applied over the surface 18 prior to, simultaneously with, or subsequent to the application of the low friction material. If applied prior to the application, any heat shrinkage should be controlled to avoid premature curing of the resin 58. If the resin 58 is applied over the fabric 50, the resin 58 must be able to permeate the fibers 54 of the fabric 50, and penetrate to the substratum external surface 18. In that case, the resin 58 should have a sufficiently low viscosity as applied to the fabric 50 to fill the interstices of the fabric 50 by capillary action. It is also important that no air is trapped by the resin 58. Preferred resins 58 include epoxy resins, particularly those which are relatively stable in storage. By adding a selected catalyst to the resin 58 in the known manner, its viscosity as well as a predetermined curing cycle, in terms of time and temperature, can be controlled or adjusted as necessary. The resin 58 actually fills the interstices of the fibers 54 in the fabric 50 and also fills the small voids between the external surface 18 and the portions of the fibers 54 bridging the external surface 18. The resin 58 thus permeates and largely surrounds each of the fibers 54 and in effect these fibers 54 are suspended in resin.

If a series of individual bearing elements have been used to form the inner substratum 10, it is desirable that the resin 58 to be applied over the bearing elements be prevented from flowing therebetween, or between bearing elements and any spacers, if used, to prevent the resin 58 from entering the limited clearance between elements and around the mandrel 22. For that purpose, a sealant may be provided between the adjoining end faces of the bearings, or between bearing end face and spacer, if spacers are used. This sealant may be a semi-liquid coating applied to the end faces before their assembly on the mandrel 22, or may be thin washers, not shown, which are assembled on the mandrel 22 intermediate the bearings. Of course, when bearings are produced of a resinous composition, such as resin-impregnated fiberglass, the inner substratum 10 external surface 18 can be configured as in FIGS. 1 through 3 without first forming or detaching separate elements, obviating the need for such a sealant. In the latter case, the inner substratum 10 is not divided into finished bearings until after curing of the resin 58, as will be discussed more fully.

Reinforcing filaments 62 are applied over, or simultaneously with, the resin 58. The application of filaments 62 helps to ensure that the resin 58 fully integrates the fibers 54 of the fabric 50, coating the fibers 54 and filling interstices that exist between fibers 54, or between fibers 54 and the substratum external surface 18.

Figure 4:
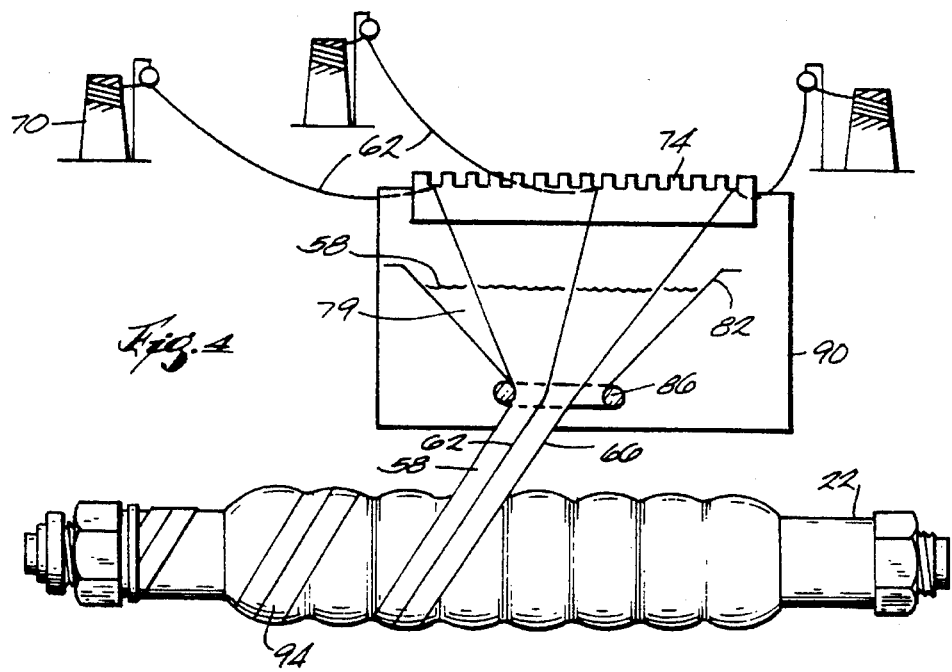
FIG. 4 is a side elevation of the mandrel supported at its ends in a winding machine for use in building up an overlayment of resin impregnated filaments.

A preferred method for applying the filaments 62 is through a filament winding process (FIG. 4) whereby the mandrel 22, and thereby the substratum 10, is supported in a winding machine, not shown, and rotated while a tape 66 of parallel filaments 62 of fiberglass having resin 58 carried thereby is repeatedly wound over the substratum. Filaments are drawn from creels 70 over a comb 74 and through resin 58 in forming the tape 66. A winding process adaptable for this purpose is described in U.S. Pat. No. 3,974,009, and is incorporated herein by reference. In this method the hardenable liquid resin 58 for coating and penetrating the fabric 50 is supplied simultaneously with the winding of the filaments 62 (FIG. 4), by passing the filaments 62 through a bath of liquid resin 58 prior to winding on the mandrel 22. In FIG. 4 the resin 58 is provided in a cone-shaped receptacle, or cone 82. The filaments pass downwardly through the cone 82 and through a ring 86 which comprises the lower end of the cone 82. Means such as a loose plug, not shown, is provided to close the cone 82 sufficiently to retain the supply of resin 58. The cone 82 may be dispensed with and the filaments 62 dipped in a pan of resin, not shown, before passing through the ring 86. Preferably several filaments 62 will be oriented parallel to each other, and will form a tape 66 of resin-impregnated filaments 62. The comb 74 and cone 82, including the ring 86, are supported on a reciprocating carriage 90 which may also be provided with means, not shown, to keep the cone 82 supplied with resin 58. By repeated passes of the tape 66 a plurality of filament layers are applied over the layer of self-lubricating fabric 50 to form an overlayment 94 of filaments 62 thereon. The hardenable liquid resin 58 coats and penetrates the overlayment 94 just as it coats and penetrates the fibers 54 of the self-lubricating fabric 50.

An advantage of this approach is that the winding is done under tension, and consequently in applying the overlayment 94 a bonding pressure is exerted by the filaments 62 sufficient to cause the layer of self-lubricating fabric 50 to conform closely to the external surface 18 of the inner substratum 10. The pressure applied by the filaments 62 also assists in forcing the resin 58 into the fabric 50, to better impregnate and penetrate resin 58 through the fabric fibers 54 and fully into contact with both the external surface 18 of the inner substratum 10. A tension on the order of two to four pounds will keep the tape 66 tight and force the resin 58 through the fibers 54 of the fabric 50. When the configuration comprises more extreme elevational contours, the winding tension may be increased to aid in forcing the fabric 50 into the recessed portions 46 of the substratum external surface 18.

With rotation of the mandrel 22 and reciprocation of the carriage 90, the fabric 50 is wrapped with the tape 66 in the known manner. The direction of the winding changes when the tape 66 nears the ends of the mandrel 22. The filaments 62 are thus helically wound in overlapping layers. Initially the angle of wind on the mandrel 22 should be kept to a minimum, to avoid bridging of filaments 62 over the reduced diameter portion 46. The narrow winding angle allows the filaments 62 to be layered more directly over and into the reduced portions 46 and forces the fabric 50 overlying those portions down. Only a sufficient number of wraps of tape 66 need be applied in forming the overlayment 94 as will substantially conform the fabric 50 to the inner substratum 10 external surface 18 and cause the resin 58 to fully penetrate the fabric 50.

When the winding is completed, the tape 66 is cut and secured, providing a generally cylindrical assembly of mandrel 22, inner substratum 10, fabric 50 and the uncured, resin-impregnated, filament-wound overlayment 94. The assembly is removed from the winding machine and is immediately ready for further processing.

This assembly is handled at its ends until curing, or hardening, of the resin 58 can be effected. Curing can be at elevated or ambient temperatures, and by any known method, such as by heating in an oven, not shown. The resin 58 can also be heated directly, such as by infra red or high frequency radio radiation. As may be required, the mandrel 22 can be rotated during the curing cycle to prevent dripping. The time for cure typically depends on temperature and catalyst if present. Upon curing of the resin 58, the hardened resin forms a rigid outer substratum 98 (FIG. 5) having bonded filaments extending circumferentially within (not shown). When cooled, the mandrel 22, if not an integral part of the substratum, may be withdrawn from the inner substratum 10 for reuse, leaving a tube, not shown, of inner and outer substratums 10 and 98 separated by fabric 50. Conversely, the mandrel 22 may be maintained with the tube to provide an arbor for subsequent machining operations. The interstices between fibers 54 in the weave of the fabric 50 and the small voids between the fibers 54 and the external surface 18 are occupied by hardened resin 58, which locks the fibers 54 tightly against the external surface 18 of the inner substratum 10. The hardened outer substratum 98 is similarly secured to the fabric 50.

The fabric 50 is in direct contact with, and has become bonded to, the external surface 18 of the inner substratum 10, due to the resin 58 which penetrated the fabric 50. Due to the tension of the filament winding step, as well as the previous shrinking of the fabric 50, the fabric 50 very tightly conforms to the external surface 18 of the inner substratum 10. The fabric 50 is also bonded to the outer substratum 98. The tube may be stored or immediately finished as will be described.

Figure 6:
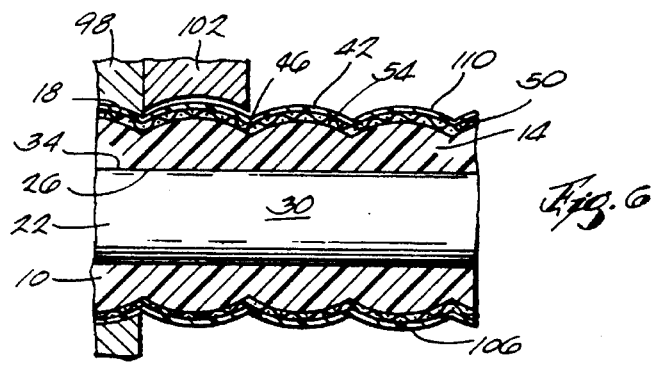
FIG. 6 is a cross section of the mandrel of FIG. 5 where the overlayment has been subsequently removed down to the layer of low friction material.

The next step comprises precision grinding, milling or otherwise machining by a material removing tool 102 to remove at least a portion of the outer substratum 98 sufficient to expose at least a portion of the layer of fabric 50 (FIG. 6). The outer substratum 98 is thereby removed down to the fabric 50 to expose the self-lubricating fibers 54, which form a low friction surface 106 on the substratum external surface 18. How much of the outer substratum 98 is removed will depend on the desired use for the low friction surface 106 in the finished product.

If the external surface 18 of inner substratum 10 was previously formed by machining, then the precision machining of the outer substratum 98 can be accomplished by the same means or elements used in configuring the substratum external surface 18. The machining should remove as much of the outer substratum 98 as possible without damaging the fibers 54 of the fabric 50. Known grinding operations, for instance using a grinding wheel 102 having a configured grinding face, can be utilized for this purpose. For instance, the depth of cut respecting the axis of the bore of the bearings can be precisely controlled so that the cut very closely approximates the fabric 50, to about 0.001 inch thereof.

The machining, while removing the substantial portion of outer substratum 98, may leave a very thin layer, or sheen 110 of hardened resin over the fabric 50. If desired, the sheen 110 can be reduced by polishing treatment, but for many applications this is not necessary as this very slight layer will wear off rapidly in use, to expose the fibers 54 in the layer of fabric 50.

Figure 7:
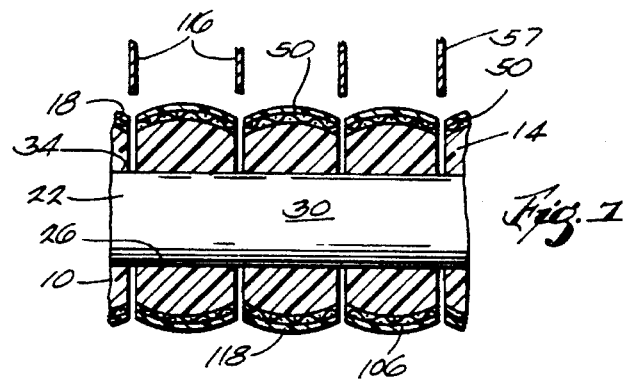
FIG. 7 shows a cross section of the winding mandrel wherein substratum on the mandrel of FIG. 6 has been cut to form discreet elements.

Individual elements, if more than one are present, are then separated and detached from the mandrel 22. If the inner substratum 10 is solid, i.e., forming its own mandrel, the elements cut from the substratum will be solid, whereas if the substratum 10 is formed over a separate mandrel 22 the separated elements will have a bore 114. Alternatively, the outer diameter may be finished after the substratum 10 has been so separated. FIG. 6 shows an external surface 18 which is formed from a series of spherical configurations which will be separated one from the other axially, such as by cutting with a radial plane cutting tool 116 in a known manner (FIG. 7). An operation adaptable for this purpose is described in U.S. Pat. No. 3,974,009, which is incorporated herein by reference. Upon completion of this operation, the newly completed elements 118 having a self-lubricating material conformed to the external surface 18 of the substratum 10 may be separately removed from the mandrel 22.

In the event that plural elements are assembled end to end in forming the substratum 10, their final separation can be effected by simply cutting the fabric 50, which operation can be accomplished by use of a cutting tool 116 preferably of a material which is softer than the substratum 10 making up the elements so that this cutting tool may be allowed to contact the ends of the elements without damage. This tool may be a hand-held knife or an automatic tool. Alternatively, throw-away spacer units can be inserted between elements and cut to detach the fibers 54 connecting adjacent elements.

The strength of the bond between the fabric 50 and the inner substratum external surface 18 is affected by a number of considerations, including the types of materials chosen for the fabric 50, the resin 58 or the inner substratum 10, as well as the preparation of the substratum external surface 18. For instance, if a ground external surface 18 is formed on a filament-wound fiberglass inner substratum 10, the grinding will open up, or expose microscopic ends (not shown) of the glass filaments 62 of the inner substratum 10 on the external surface 18. These are not of sufficient magnitude to adversely affect the conformation of fabric 50 to the external surface 18, however, upon curing of the resin 58 these ends may function in further locking the substratum external surface 18 to the hardened resin 58.

The amount of resin interposed between the fabric 50 and the substratum external surface 18 will also affect the bond strength of the fabric 50 to the external surface 18. Upon curing of the resin 58, each fiber 54 becomes embedded, or nested within hardened resin, with the effect of locking each individual fiber 54 of the fabric 50 within hardened resin 58. If the tension applied in filament-winding the overlayment 94 is too great, the fabric 50 may become so tightly conformed against the substratum external surface 18 that the resin 58 in the interstices of fibers 54 and in the voids between the fibers 54 and the external surface 18 will be excluded, or squeezed out. In such a case, the fibers 54 will not be surrounded in resin 58 but will rather be tightly crossed against one another and pressed against the external surface 18. Upon curing of the resin 58 the fibers 54 will be incompletely nested in hardened resin 58, and thus the fibers 54 may be insufficiently locked against the external surface 18.

The tension used in winding the filaments over the fabric is, thus, preferably the same as used for the method of forming an inner diameter bearing surface by filament-winding over fabric applied over a mandrel. If the tension utilized is the same, the fibers of the fabric will be surrounded by resin to the same degree, and, upon curing, the fibers will be nested in the same manner in the same amount of hardened resin. In this way the attachment of a fabric to a substratum external surface will be as great as the degree of attachment formed between the fabric inner diameter of a bearing produced by the method of the prior art whereby a resin-impregnated overlayment is formed over a fabric applied over a mandrel, and then cured.

In an alternative embodiment shown in FIGS. 8, 9 and 10, an inner substratum 122 is produced by a procedure similar to that disclosed for manufacturing bearings in previously mentioned U.S. Pat. No. 3,616,000. In this case a first layer of self-lubricating material is applied over the mandrel surface 34, which has preferably been pre-coated with a suitable parting agent. Many suitable silicone materials are known for this purpose. The mandrel surface 34 will define the configured internal surface 126 of the inner substratum 122. The low friction material is preferably a fabric 130 of self-lubricating fibers 132. The fabric 130 is conformed to the mandrel surface 34. The inner substratum 122 is formed by applying a plurality of filaments, which can be the same as filaments 62, over the first layer of fabric 130 to form a first overlayment in a procedure similar to that described for FIG. 4. A hardenable liquid resin 58 is applied prior to, simultaneously with, or subsequent to the application of the filaments 62 to coat the first layer of fibers 132 on the mandrel 22, to coat the filaments 62, and to fill any interstices. As was the case for the formation of the outer substratum 98, the filaments 62 of the first overlayment are preferably applied helically and under tension.

Next, the resin-impregnated first overlayment is cured to form the inner substratum 122. The first layer of fabric 130 becomes bonded, and conforms tightly, to the internal surface 126 of the inner substratum 122. As is known from the prior art, helically winding the filaments 62 in overlapping layers during the overlayment process results in added strength in the axial direction for the hardened substratum 122. Varying the degree of wind varies the degree of axial strength.

After curing of the inner substratum 122 an external surface 134 is configured thereon and a self-lubricating fabric applied in the same manner as described for FIGS. 2 through 7 for the external surface 18 of the substratum 10. Thus, a substratum 122 having both an internal surface 126 and an external surface 134 of a desired configuration can be produced where both surfaces are integrally bonded to a resin-penetrable, self-lubricating fabric.

Figures 11, 12, 13:
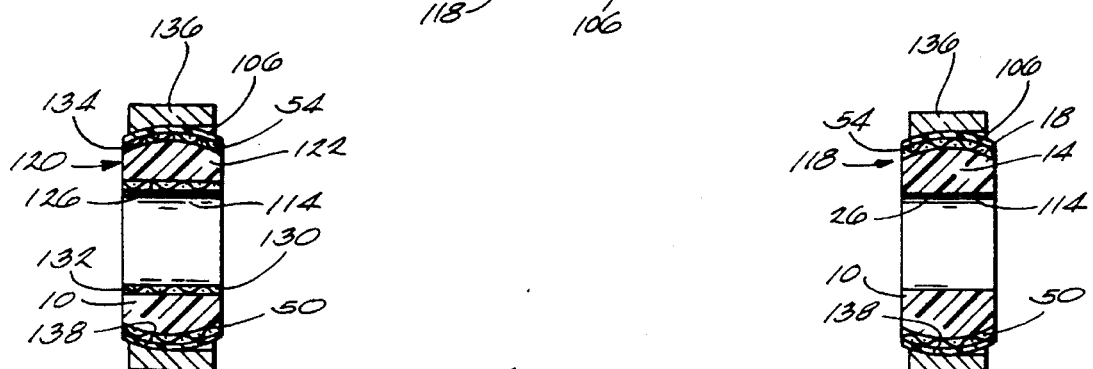
FIG. 11 is a perspective view of a teflon-lined ball disposed adjacent a keyed socket.
FIG. 12 discloses the teflon lined ball of FIG. 11 inserted into the keyed socket.
FIG. 13 discloses a ball produced by the alternative method wherein the ball has a low friction fabric applied over the cylindrical internal surface as well as the spherical outer surface.

FIGS. 11 through 13 disclose ball and socket bearing arrangements wherein the ball 118 has been produced by the disclosed process. The outer race, or socket 136 has a spherical inner diameter 138 corresponding to the outer diameter or surface 106 of the ball 118. The socket 136 can be of any suitably durable material, such as steel, or can be of a hardened synthetic material which is reinforced by glass filaments. The socket 136 disclosed in the Figures is a keyed socket, which permits insertion and removal of the ball 118 when the ball 118 is turned at right angles to the socket 136, and so when the ball 118 wears out it can be replaced without replacing the socket 136. In FIG. 11 the ball 118 is not inserted in the socket 136.

FIG. 12 shows an embodiment produced by the steps described in FIGS. 1 through 7, wherein a low friction material has been applied only to the external surface 18 of a bearing 118.

In the bearing arrangement disclosed in FIG. 13, an alternative bearing 120 is disclosed which is produced by including the steps of building up the inner substratum 122 over a self-lubricating fabric 130, as is described for FIGS. 8 through 10. The fabric 130 has been applied over the external surface 134 of the inner substratum 122. This bearing has the ability to rotate about its inner and outer diameters, can misalign on its outer diameter and can both rotate and slide axially on its inner diameter. When the inner substratum 122 is produced by filament winding, a composite filament-wound low-cost ball structure results which provides a body having a high strength to body weight ratio capable of sustaining high or low loads, and having a low wear rate because of the self-lubricated bearing material applied to both the internal surface 126 and the external surface 134. When inserted into a metal socket, the load capacity and wear rates approach that of a ball and socket where the ball is metal and the socket has a woven Teflon fabric on the internal surface. Such a bearing is disclosed in previously mentioned prior art U.S. Pat. No. 3,974,009. The bearing 118 disclosed herein has much lower overall weight, better corrosion resistance, and lower cost relative to a metal ball. The high strength to weight characteristics of the resin-impregnated body combined with the secure fixation of the self-lubricating bearing surfaces make such a bearing an attractive alternative to the more expensive bearings of the prior art.

Figure 5:
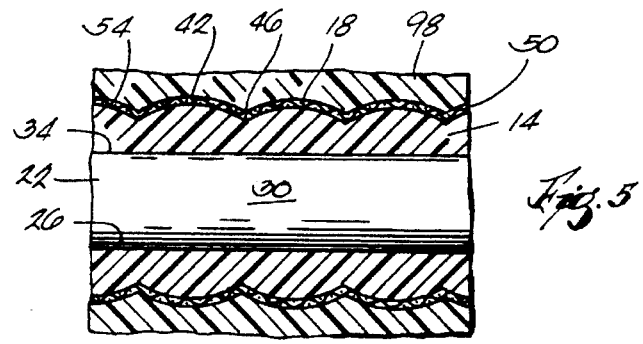
FIG. 5 shows a winding mandrel in cross section with a finished overlayment applied over the low friction material.

FIGS. 14 and 15 disclose another alternative embodiment whereby the method used to produce bearing 118 is used to produce a sliding bearing element 140 of a scotch yoke. The bearing element 140 has an inner substratum 142 having an external surface 146 with a composite configuration. The external surface 146 comprises alternating opposed flat portions 150 and 154 and cylindrical portions 158 and 162 (FIG. 5). A fabric layer 166 and outer substratum 170 are formed over the inner substratum 142 by the previously described method. Since sliding is only intended to occur on the flat external surfaces 150 and 154, it is not necessary to remove those portions of the outer substratum 170 overlying the external cylindrical portions 158 and 162. During machining of the outer substratum 170 only those portions 174 and 178 of outer substratum 170, shown in phantom in FIG. 15, are removed which overly the flat external surfaces 150 and 154 of the inner substratum 142, and only the fabric layer 166 bonded to the flat surfaces 150 and 154 is thereby exposed.

From the foregoing description, one skilled in the art can make various changes and modifications to adapt the invention to various usages and conditions without departing from the spirit and scope of the invention.

What is claimed is:

1. A method of manufacturing a bearing including a substratum having an external surface to which a self-lubricating material is integrally bonded to provide a self-lubricating bearing surface, said method comprising the steps of:

applying a layer of self-lubricating resin penetrable bearing material onto said external surface;

providing a hardenable liquid resin to coat and penetrate said bearing material;

applying an overlayment of filaments onto said layer of bearing material to exert a bonding pressure on said layer of bearing material sufficient to cause said layer of bearing material to conform and bond to said external surface;

hardening said resin; and removing at least part of said overlayment of filaments after said resin has hardened to expose at least selected portions of said layer of self-lubricating bearing material.

2. The method of manufacturing according to claim 1 wherein said method includes the step of providing a hardenable liquid resin to coat and penetrate said overlayment of filaments.

3. The method of manufacturing according to claim 1 wherein said step of applying an overlayment of filaments onto said layer of bearing material includes the step of winding a plurality of filaments under tension over said layer of self-lubricating material.

4. The method of manufacturing according to claim 1 wherein said step of applying an overlayment of filaments onto said layer of bearing material includes the step of helically winding said filaments under tension in overlapping relation onto said layer of self-lubricating material.

5. The method of manufacturing according to claim 1 wherein said layer of self-lubricating resin penetrable bearing material includes self-lubricating fibers and shrinkable fibers, and wherein said method of manufacturing includes the step of heating said layer of bearing material to shrink the shrinkable fibers.

6. The method of manufacturing according to claim 5 wherein said step of heating said layer of self-lubricating resin penetrable material precedes said step of applying an overlayment of filaments onto said layer of bearing material.

7. The method of manufacturing according to claim 1 wherein said step of applying a layer of self-lubricating resin penetrable bearing material onto said external surface is preceded by the step of forming said external surface with a spherical outside diameter.

8. The method of manufacturing according to claim 1 wherein said method of manufacturing includes the step of forming said substratum by winding fiberglass material around a mandrel, said step of forming said substratum preceding said step of applying a layer of self-lubricating resin penetrable bearing material onto said configured external surface.

9. The method of manufacturing according to claim 2 wherein said step of providing a hardenable liquid resin to coat and penetrate said bearing material and said step of applying an overlayment of filaments onto said layer of bearing material are performed simultaneously by drawing said filaments through a bath of said liquid resin prior to winding said filaments onto said layer of bearing material.

10. A method of manufacturing a bearing including a substrate having internal and external surfaces of desired configurations to which a resin penetrable self-lubricating bearing material is integrally bonded to provide self-lubricating internal and external bearing surfaces, said method comprising the steps of:

forming an outer surface on a mandrel which defines the desired configured internal bearing surface;

applying a first layer of self-lubricating resin penetrable bearing material to the mandrel outer surface;

applying a first overlayment of filaments onto said first layer of self-lubricating bearing material to exert a bonding pressure sufficient to integrally bond said first overlayment to said first layer of self-lubricating bearing material and conform said first layer to said mandrel outer surface;

applying a first coat of hardenable liquid resin to coat and penetrate said first layer of self-lubricating bearing material and said overlayment;

curing said first coat of resin to form a hardened inner substratum;

forming an external surface of any desired configuration on said hardened inner substratum;

applying a second layer of self-lubricating resin penetrable bearing material onto said configured external surface of the hardened inner substratum;

applying a second coat of hardenable liquid resin to coat and penetrate said second layer of bearing material;

applying a second overlayment of filaments onto said second layer of bearing material to exert a bonding pressure on said second layer of bearing material sufficient to cause said second layer of bearing material to conform and bond to said configured external surface;

hardening said second coat of resin to form a hardened outer substratum;

removing at least part of said second overlayment of filaments after said resin has hardened to expose at least selected portions of said second layer of self-lubricating bearing material; and removing said bearing from said mandrel to expose said self-lubricating internal bearing surface.

11. The method of manufacturing according to claim 10 wherein said step of applying a first overlayment of filaments onto said first layer of self-lubricating resin penetrable bearing material includes the step of helically winding a plurality of filaments under tension over said first layer of self-lubricating resin penetrable bearing material, and wherein said step of applying a second overlayment of filaments onto said second layer of self-lubricating resin penetrable bearing material includes the step of helically winding a plurality of filaments under tension over said second layer of self-lubricating resin penetrable bearing material.

12. The method of manufacturing according to claim 1 wherein said substratum includes an internal surface to which additional resin penetrable self-lubricating bearing material is integrally bonded to provide a self-lubricating internal bearing surface, and wherein said method includes the steps of applying an additional layer of self-lubricating resin penetrable bearing material to a configured surface, and forming said substratum by applying an additional overlayment of filaments onto the additional layer of self-lubricating bearing material to exert a bonding pressure sufficient to integrally bond said additional overlayment to said additional layer of self-lubricating bearing material and conform said additional layer to said configured surface.

13. The method of manufacturing according to claim 12 wherein said method includes the step of applying an additional coat of hardenable liquid resin to coat and penetrate said additional layer of self-lubricating bearing material and said additional overlayment, curing said additional coat of resin, and forming an external surface of any desired configuration on said substratum prior to said step of applying said layer of self-lubricating resin penetrable bearing material onto said external surface.

14. The method of manufacturing according to claim 13 wherein said configured surface forms part of the outer surface on a mandrel, and wherein said method includes the step of removing said bearing from the mandrel to expose said self-lubricating internal bearing surface.

* * * * *